(12) United States Patent
Burgess et al.

(10) Patent No.: US 11,572,172 B2
(45) Date of Patent: Feb. 7, 2023

(54) OPTIMALLY CONFIGURED AIR-FLOW GALLEY CART

(71) Applicant: The Boeing Company, Chicago, IL (US)

(72) Inventors: Michael J. Burgess, Seattle, WA (US); James P. Schalla, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 115 days.

(21) Appl. No.: 16/773,653

(22) Filed: Jan. 27, 2020

(65) Prior Publication Data

US 2020/0164987 A1 May 28, 2020

Related U.S. Application Data

(63) Continuation of application No. 14/267,188, filed on May 1, 2014, now abandoned.

(51) Int. Cl.
| | |
|---|---|
| *B64D 11/00* | (2006.01) |
| *B64D 11/04* | (2006.01) |
| *F25D 11/00* | (2006.01) |
| *F25D 17/04* | (2006.01) |
| *B62B 3/00* | (2006.01) |

(52) U.S. Cl.
CPC .......... *B64D 11/0007* (2013.01); *B62B 3/002* (2013.01); *B64D 11/04* (2013.01); *F25D 11/003* (2013.01); *F25D 17/04* (2013.01); *B62B 2202/67* (2013.01); *B62B 2204/04* (2013.01); *Y10T 29/49361* (2015.01)

(58) Field of Classification Search
CPC ... B64D 11/0007; B64D 11/04; F25D 11/003; F25D 17/04; B62B 3/002; B62B 2202/67; B62B 2204/04; Y10T 29/49361
USPC .......................................................... 454/69
See application file for complete search history.

(56) References Cited

U.S. PATENT DOCUMENTS

| | | | | |
|---|---|---|---|---|
| 4,346,756 A | * | 8/1982 | Dodd | A47J 39/006 |
| | | | | 126/268 |
| 5,125,520 A | * | 6/1992 | Kawasaki | A47B 31/04 |
| | | | | 108/91 |
| 5,369,960 A | | 12/1994 | Mueller et al. | |
| 5,544,853 A | | 8/1996 | Choi | |
| 2004/0159118 A1 | | 8/2004 | Hu | |
| 2005/0253019 A1 | | 11/2005 | Hoehne et al. | |
| 2011/0277489 A1 | | 11/2011 | Schalla et al. | |

FOREIGN PATENT DOCUMENTS

| | | |
|---|---|---|
| CN | 102379532 A | 3/2012 |
| DE | 4105034 A1 | 8/1992 |
| EP | 2807957 A1 | 3/2014 |
| JP | 07236527 A * | 9/1995 |
| JP | H07289361 A | 11/1995 |
| WO | 2011019909 A1 | 2/2011 |
| WO | 2012158297 A2 | 11/2012 |
| WO | 2014003882 A1 | 1/2014 |

* cited by examiner

*Primary Examiner* — Allen R. B. Schult
(74) *Attorney, Agent, or Firm* — Felix L. Fischer

(57) ABSTRACT

A galley cart has a rear wall with an inlet port and an outlet port. A first divider has a first edge, wherein a first distance is defined between the first edge and a front wall. A second divider has a second edge, wherein a second distance is defined between the second edge and the front wall. The second distance is less than the first distance for control of the flow of cooling air.

16 Claims, 8 Drawing Sheets

OPTIMALLY CONFIGURED AIR-FLOW GALLEY CART

REFERENCE TO RELATED APPLICATIONS

This application is a continuation of application Ser. No. 14/267,188 filed on May 1, 2014 entitled OPTIMALLY CONFIGURED AIR-FLOW GALLEY CART having a common assignee with the present application, the disclosure of which is fully incorporated herein by reference.

BACKGROUND INFORMATION

Field

Embodiments of the disclosure relate generally to galley cart systems for transportation vehicles and, more particularly, to a system for providing improved distribution for cooled working fluid in insulated galley carts.

Background

Galley carts employed for food service in transportation vehicles such as aircraft and trains often require cooling to maintain food and beverages at a temperature that is cooler than a cabin of the vehicle. At least some known carts include or connect to an active refrigeration system (a chiller) that provides cool air to an interior volume of the cart to cool the food/beverages. Other carts employ connections to a galley cooling system which provide cooled air or sublimated $CO_2$ for cooling of the contents of the cart. In either case, at least some known galley carts do not provide controlled flow of the entering cooling gas to create distribution of the gas for substantially equal cooling in all parts of the cart. The cooling air flow in existing galley carts travels, primarily, down the walls of the galley cart, as opposed to over the entire contents therein. This creates a problem of unequal cooling or instances where food in the middle of a galley cart can be warmer compared to food on a top shelf (top shelf food remains sufficiently cooled because a cool air inlet is placed at a top of the galley cart).

It is therefore desirable to provide improved structural designs for providing uniform distribution of cooling air within the galley cart.

SUMMARY

Exemplary embodiments provide in a first aspect a galley cart having a housing with an inlet port and an outlet port. A first divider has a first edge, wherein a first distance is defined between the first edge and a front wall. A second divider has a second edge, wherein a second distance is defined between the second edge and the front wall. The second distance is less than the first distance for control of the flow of cooling air.

In a second aspect, the embodiments provide a galley cart having a housing with an inlet port and an outlet port. A first divider has a front edge spaced from a front wall and a second divider has a front edge spaced from the front wall. A ramp is mounted to the front wall directing cooling air flow from a volume between a top wall and the first divider into a volume between the first divider and the second divider.

The embodiments herein provide a method for uniform distribution of cooling air flow in a galley cart by providing flow from an inlet port into a first volume over a first divider. Spacing a front edge of the first divider at a distance from a front wall or door and spacing a front edge of a second divider at a lesser distance from the front wall controls flow from the first volume into a second volume between the first divider and the second divider.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein employ insulated galley carts (IGC) with tray shelves supported to provide predetermined flow channels for cooling gas flowing through the carts from a top inlet valve to a bottom exhaust or outlet valve. In a first embodiment a ramped tray configuration encourages mixing of flow at flow rates that are lower than flow rates in prior art carts. The ramping of the trays creates what are effectively varying area flow ducts. These ducts help route cold air to each tray row evenly. In a second embodiment air ramps may be incorporated into the door and rear wall. These ramps deflect the downflowing air into the tray rows, improving circulation. In a third embodiment the trays are configured in a staggered configuration. This creates a pathway where air must flow from the inlet to the outlet by passing every tray row. Because less air is required using this structure than with conventional air-through carts, less space is required for air ducts in the galley, and the galley depth can be reduced.

Figure 1:
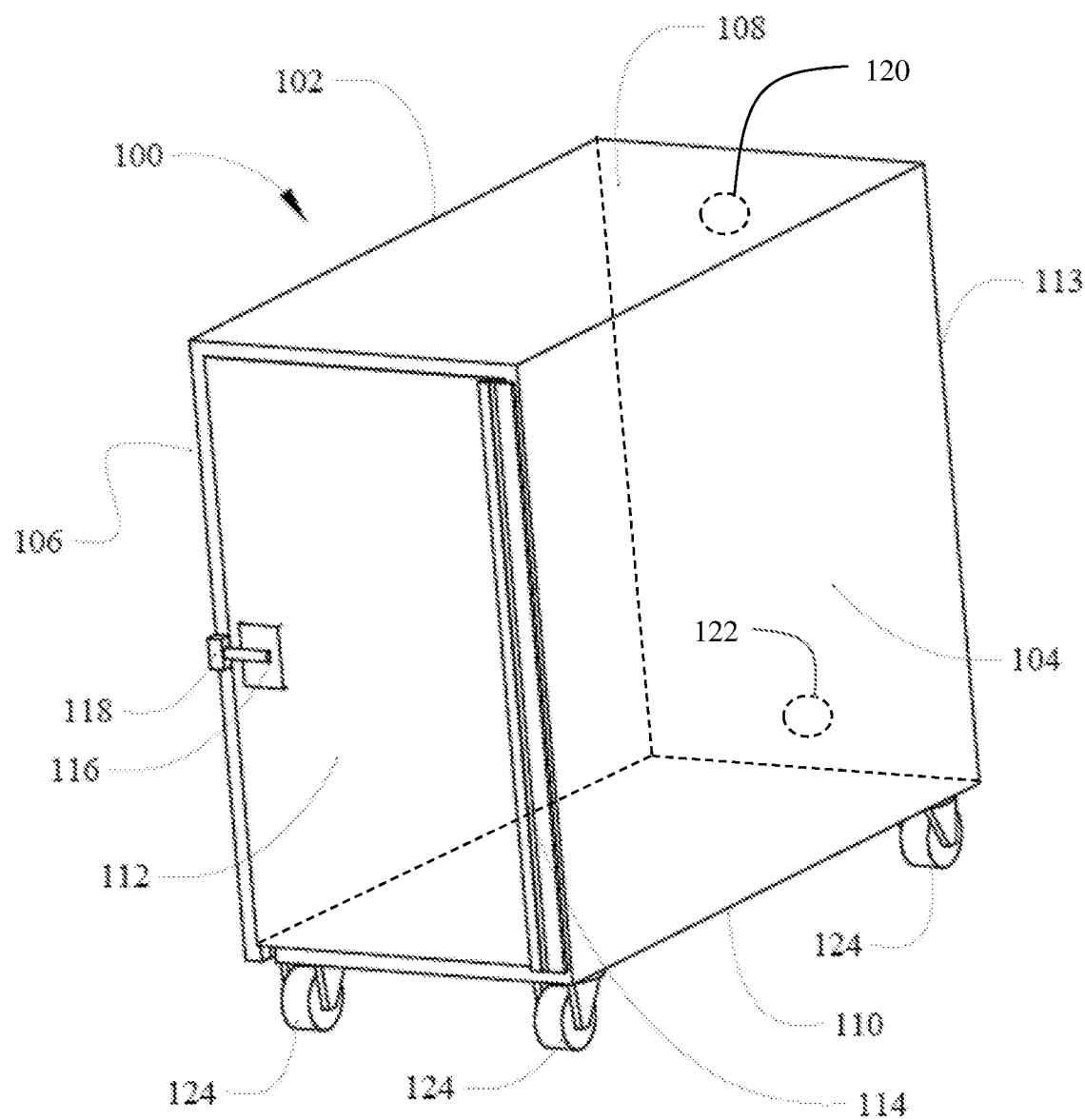
FIG. 1 is a perspective front view of an exemplary galley cart in which the disclosed embodiments may employed.

Referring to the drawings, FIG. 1 is an isometric view of an IGC 100 which may be employed in the embodiments disclosed herein. In the illustrated embodiment the IGC 100 includes a housing 102 and the housing 102 has a first side 104, a second side 106, a top 108, and a bottom 110. The IGC 100 further includes a first door 112 positioned on one end of the housing 102. The door 112 can further include one or more hinges 114 and a latch 116. The hinges 114 pivotally attach the doors 112 to the housing 102. The latch 116 can be configured to releasably engage corresponding receivers 118 attached to the housing 102 when the door 112 is in a closed position as illustrated in FIG. 1. As shown in phantom, the housing 102 of the IGC 100 employs in, for example a rear wall 113, an inlet port 120 and an outlet port 122 each having flow operated valves as will be described in greater detail subsequently.

Figure 2:
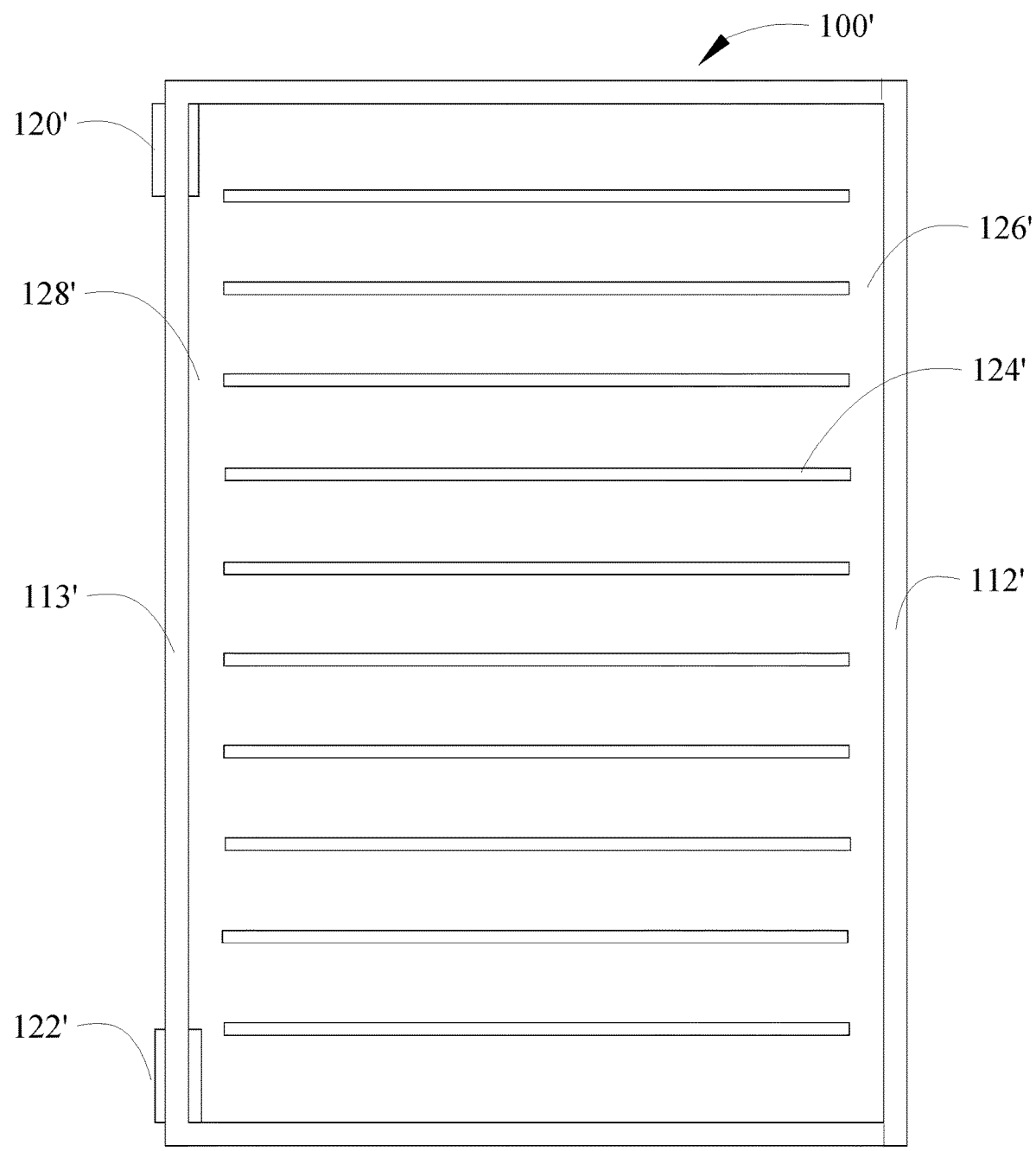
FIG. 2 is a side section view of a prior art arrangement of a shelf structure within a galley cart.

As shown in FIG. 2 for prior art configurations of IGCs, support trays 124' are mounted within the IGC 100' providing symmetrical spacing of the trays from the door 112' and rear wall 113'. The spacing provides a flow gap 126' at the front of the IGC and a flow gap 128' at the rear of the IGC. Cooling flow entering the inlet port 120' flows into the volume over the top tray and flows downward through the flow gaps 126', 128'. Limited natural convention of the flow into the volumes above the subsequent vertically arranged trays provides cooling of those volumes but without even distribution of flow.

Figure 3:
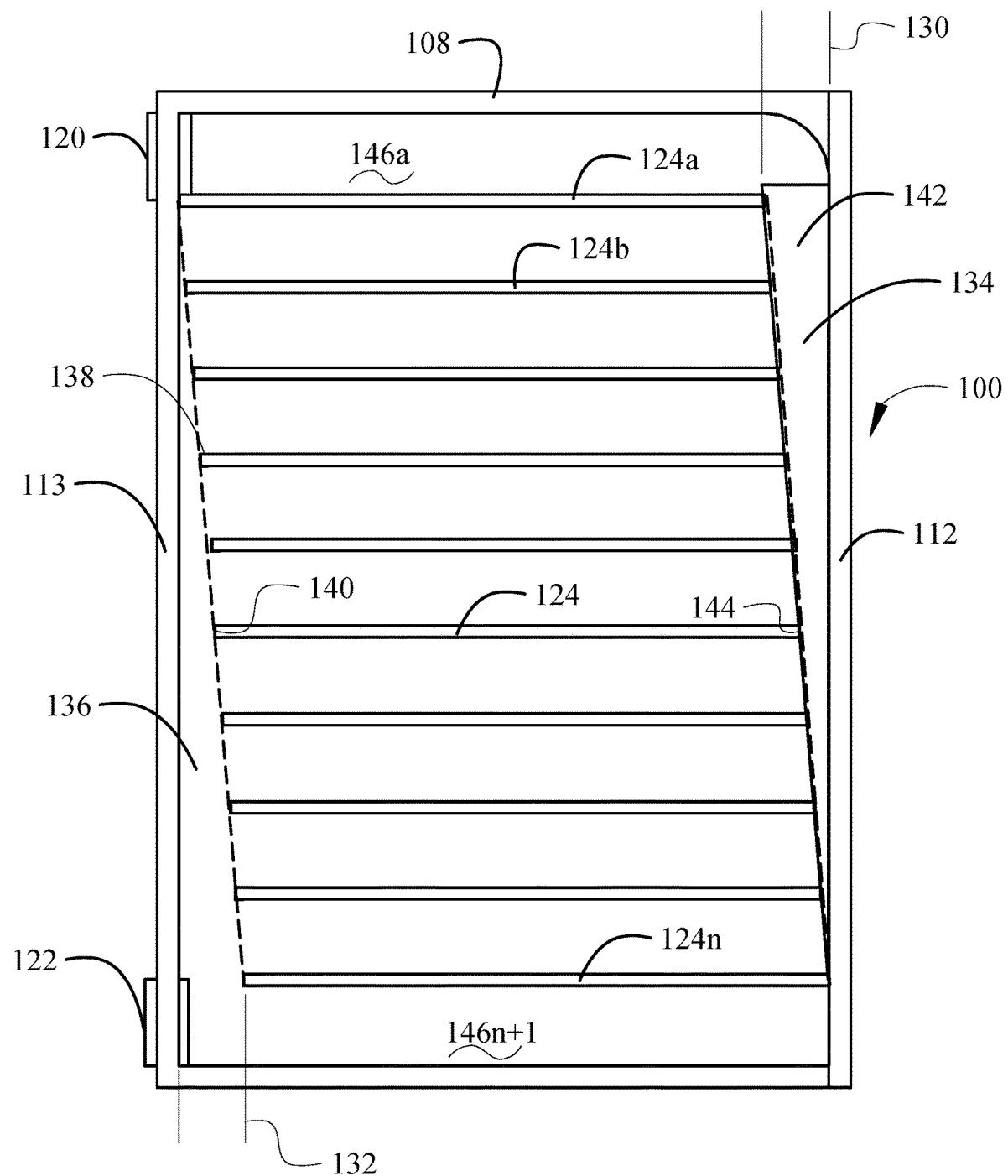
FIG. 3 is a side section view of a first embodiment for improved cooling flow with inlet and exhaust or outlet valves aligned with above and below a top tray support and bottom tray support, respectively.

In the present embodiments, IGC 100 includes a plurality of dividers such as partitions, shelves, trays or containers referred to herein generally as "trays" for clarity, but it is to be understood that any suitable divider may be employed. FIG. 3 demonstrates a first embodiment wherein the trays 124 are mounted in a ramped or progressively staggered geometry with the top tray 124a adjacent the rear wall 113 leaving a first or front gap 130 as a first distance between a front or first edge of the tray and the door 112 forming a front wall. A second tray 124b is positioned with the front or second edge at a second distance from the door less than the first distance of the top tray. The galley cart as shown includes the housing 102 with an inlet port 120 and an outlet port 122. The first tray 124a or divider is present having a first edge, wherein a first distance is defined between the first edge and the front wall or door 112. A second tray 124b or divider is present having a second edge, wherein a second distance is defined between the second edge and the front wall, and wherein the second distance is less than the first distance.

For the embodiment of FIG. 3, each successively lower tray progressing downward is mounted with a sequentially increasing second or rear gap 132 and a sequentially decreasing front gap 133 forming an inflow channel 134 and outflow channel 136 from the descending trays to the bottom tray 124n. The inflow channel 134 decreases in cross sectional area as air flows downward to descending trays. The galley cart as shown in this embodiment includes a plurality of trays 124 or dividers of equal length including the first and second trays 124a, 124b, wherein trays or dividers successively lower from the first and second trays have front edges at sequentially narrowing distance from the door 112 or front wall.

The outflow channel 136 increases in cross sectional area downward along the trays to accept greater cumulative volumetric flow rate from the successive descending trays. The galley cart as shown provides the trays or dividers successively lower from the first and second trays 124a and 124b with rear edges at sequentially widening distance from the rear wall 113. The front edges form the inflow channel 134 with reducing area descending from the first tray 124a or divider to a bottom tray 124n or divider and the rear edges form the outflow channel 136 with increasing area descending from the first divider to the bottom divider.

To allow the trays 124 to be removable on standard tray supports (not shown), stops 138 may be employed on one or both side walls against which the rear edges 140 of the trays are urged. A triangular bumper 142 is placed on the interior of the door 112 to contact the front edges 144 of the trays urging them against the stops 138; however a bumper having any suitable shape may be used. The described embodiment may also be employed with food tubs as opposed to trays by employing a deformable bumper 142. Alternatively, the trays may be fixed to the side walls of the IGC 100 with the desired end spacing to achieve the desired ramp of cross sectional area with each tray descending from the top tray 124a to the bottom tray 124n.

The housing 102 includes the inlet port 120 and the outlet port 122. In a particular embodiment, placement of the inlet port 120 and outlet port 122 in the rear wall 113 of the IGC 100 may be centered on the volume 146a above the top tray 124a and volume 146n+1 below the bottom tray 124n as shown in FIG. 3 or, as shown in FIG. 4, may alternatively be centered on the first tray 124a to bisect the flow into both the top volume 146a and second volume 146b and similarly centered on the bottom tray 124n accepting flow from the second to bottom volume 146n between the second tray to the bottom and the bottom tray and bottom volume 146n+1 between the bottom tray and the bottom 110 of the housing 102.

Figure 4:
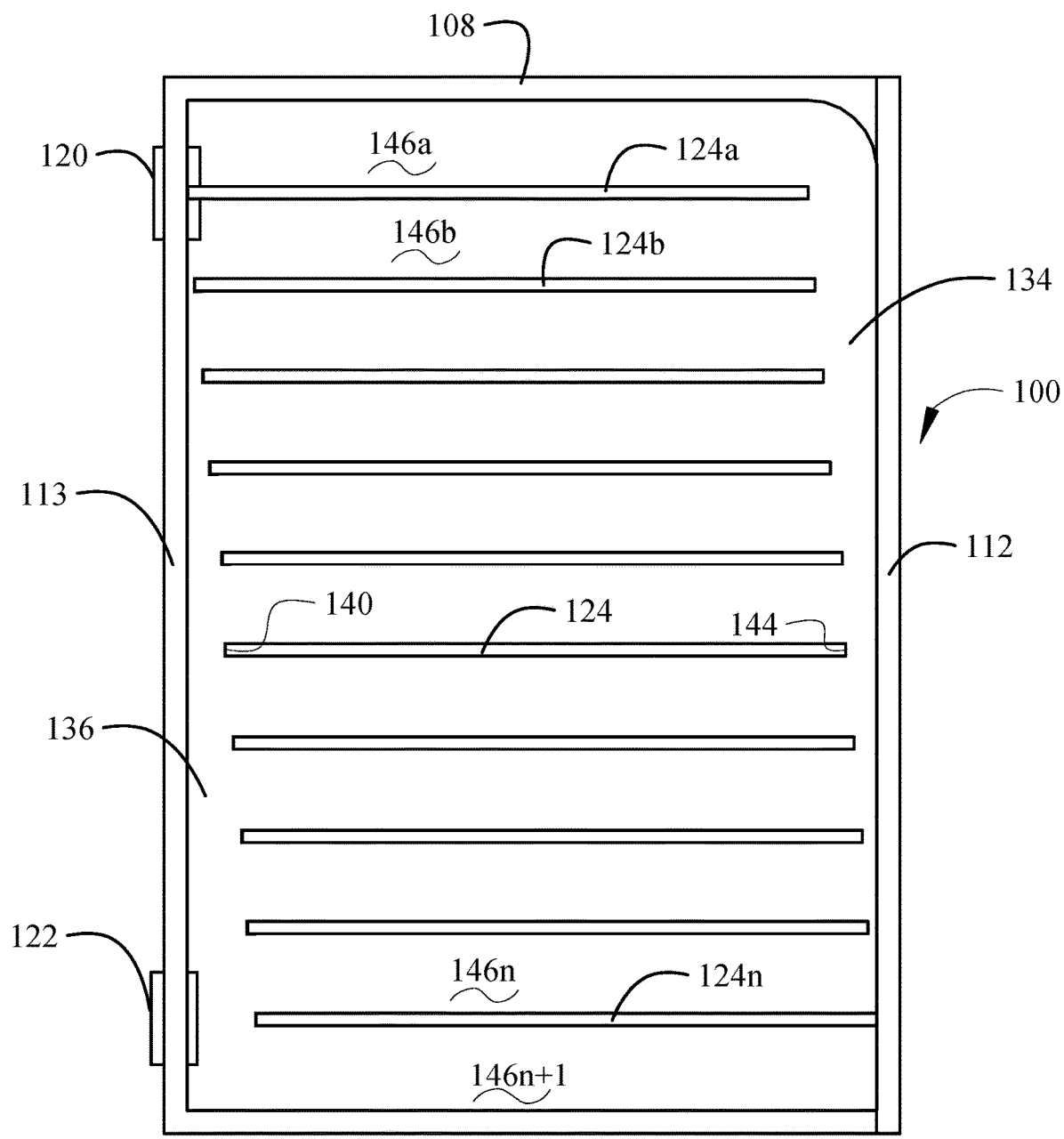
FIG. 4 is a side section view of the first embodiment with inlet and outlet valves bisected by a top tray support and bottom tray support, respectively.

As seen in both FIG. 3 and FIG. 4 but numbered in FIG. 4 for clarity, the top wall 108 of the IGC 10 may employ a shaped cove 148 adjacent the door 112 to urge flow in the top volume 146a downward into the inflow channel 134.

Figure 5:
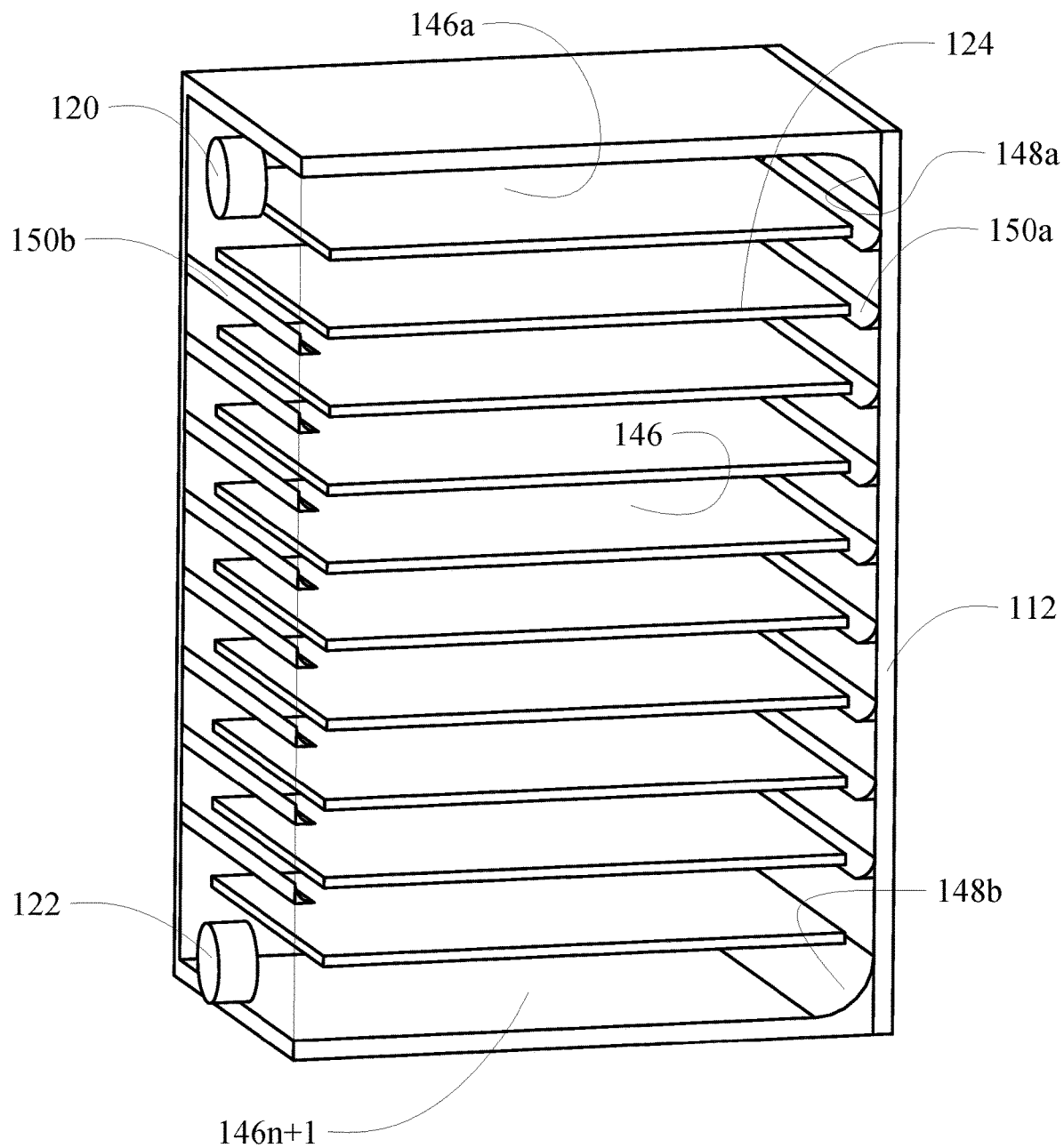
FIG. 5 is a rear perspective view of a second embodiment shown with rear and left sides of the cart transparent to show the interior shelf arrangement.
Figure 6:
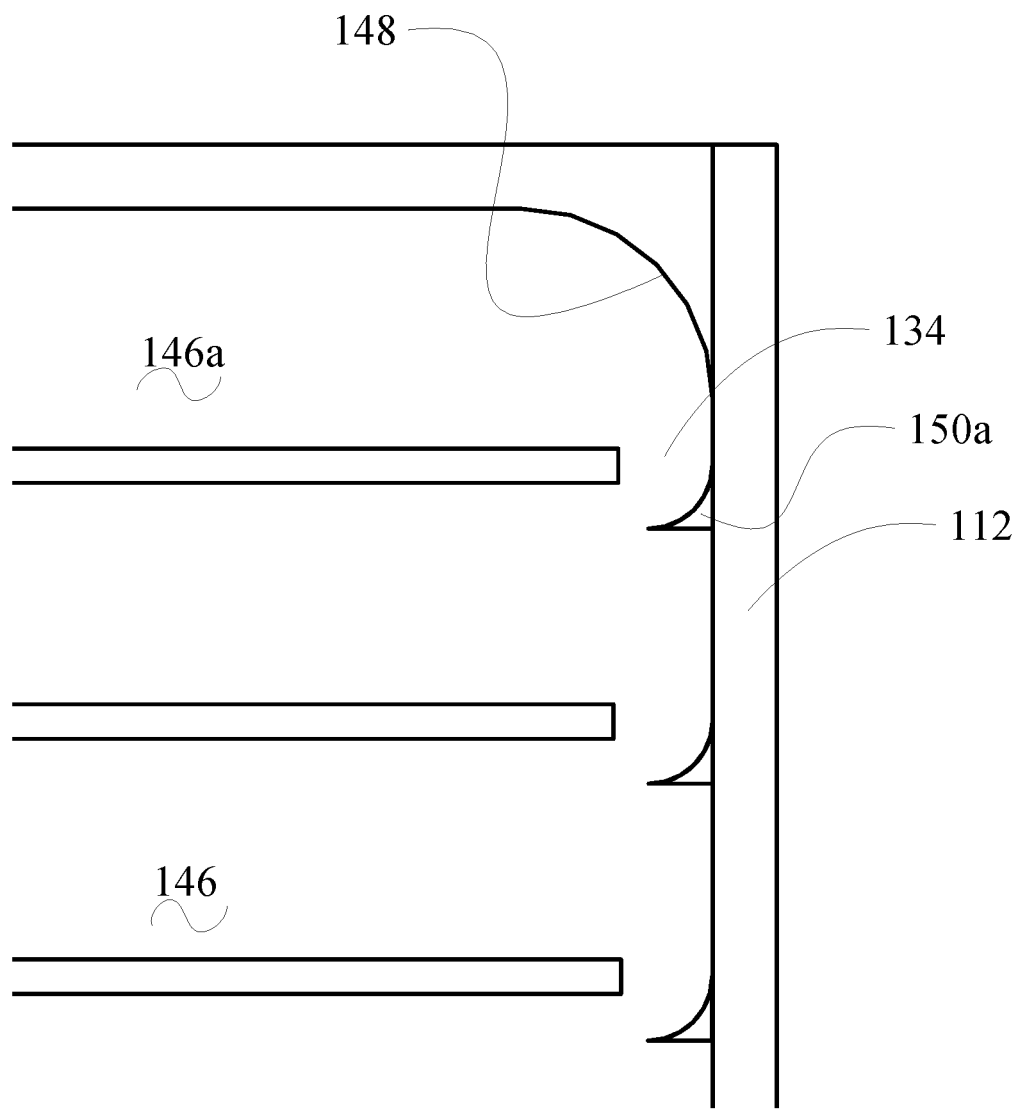
FIG. 6 is a detailed view of the shelf and ramp arrangements of the second embodiment.

As shown in FIGS. 5 and 6, a second embodiment employs ramps 150a mounted to the door 112 to urge turning to direct cooling air flowing down the inflow channel 134 into the volumes 146 between the trays. Similarly, ramps 150b may be mounted to the rear wall 113 to urge flow turning from the volumes 146 into the outflow channel 134. The ramps 152 may be located in alignment with the trays as shown in the drawings of the exemplary embodiment or between the trays. This embodiment may be used in conjunction with the ramped inflow and outflow channels previously described or to enhance flow distribution in conventionally spaced trays. As seen in FIGS. 5 and 6, a cove 148a in the top wall 108 and/or, as seen in FIG. 5, a cove 148b in the bottom wall 110 may also be employed to smooth entering flow of cooling air from the top volume 146a and into the bottom volume 146n+1.

Figure 7:
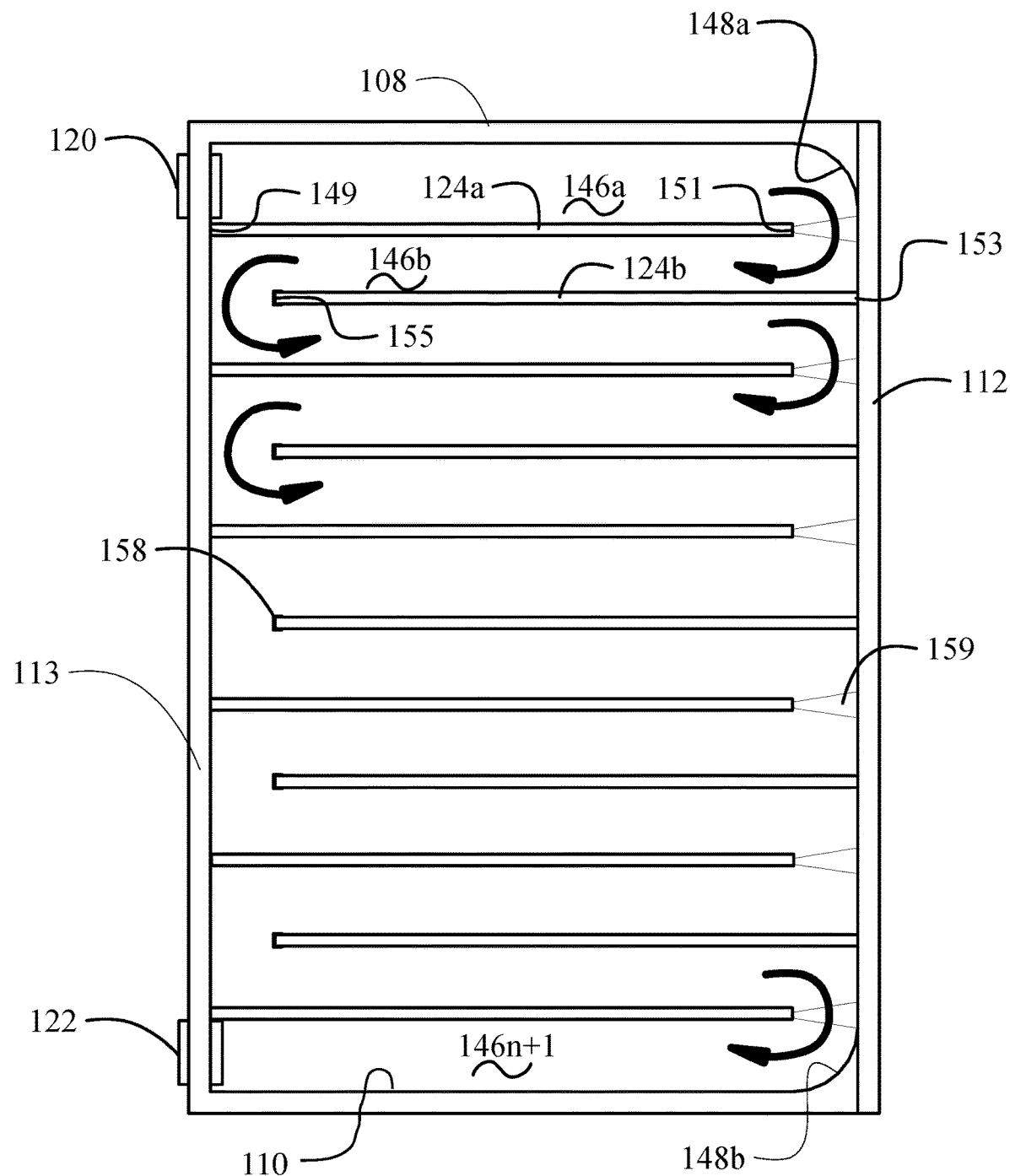
FIG. 7 is a side section view of a third embodiment.

A third embodiment is shown in FIG. 7 in which a plurality of dividers of equal length includes the first and second dividers. In such an embodiment, odd dividers are positioned nearer a bottom wall 110 than the first divider and have first edges positioned at the first distance. Even dividers are positioned nearer the bottom wall 110 than the second divider and have second edges positioned at the second distance providing evenly staggered spacing of even and odd dividers. More specifically, the top tray 124a is mounted with a rear edge 149 substantially against the rear wall 113 and having a front edge 151 spaced from the door 112 providing a first or front gap 152 with the door 112 in a closed position. The second shelf 124b of substantially equal length to the first tray is mounted substantially flush with the door 112 in the closed position, or at a minimum, having a front edge 153 spaced with a gap less than the front gap 152 of the top tray, and providing a second rear gap 154 between the rear edge 155 of the tray and the rear wall 113.

In a particular embodiment, the second distance is substantially zero or null such that the second gap 132 is eliminated and the second edges are positioned substantially flush with the door 112.

Trays, also of equal length, successively descending from the first and second trays are alternatingly mounted evenly staggered to provide the front gap 152 and rear gap 154 to force a serpentine flow of cooling gas from the inlet port 120 from the top tray volume 146a to subsequent tray volumes, as represented by arrows 156, descending to the bottom volume 146n+1 to exit at the outlet port 122. This serpentine flow assures cooling air is distributed to all volumes between the trays with substantially constant and equal flow. The galley cart for this embodiment provides a plurality of dividers of equal length including the first and second dividers wherein odd dividers positioned nearer a bottom wall than the first divider have first edges positioned at the first distance and even dividers positioned nearer the bottom wall than the second divider have second edges positioned at the second distance providing evenly staggered spacing of even and odd dividers.

As with the progressively staggered embodiment described above for IGCs with removable trays, tray stops 158 may be employed on the side walls of the IGC to space the second tray 124b and even alternating trays from the rear wall 113. Feeler probes 159 attached to the door 112 may be employed to contact the front edge 153 to urge the top and odd alternating trays against the back wall of the enclosure without significantly limiting flow between the front edge and door 112. The first tray 124a and odd alternating trays may be urged against the rear wall 113. Alternatively the trays may be fixed to the side walls in the evenly staggered position. A top cove 148a and/or bottom cove 148b in the bottom 110 of the housing adjacent the door 112 may also be employed to smooth flow in at the initiation and termination of the serpentine path.

Figure 8:
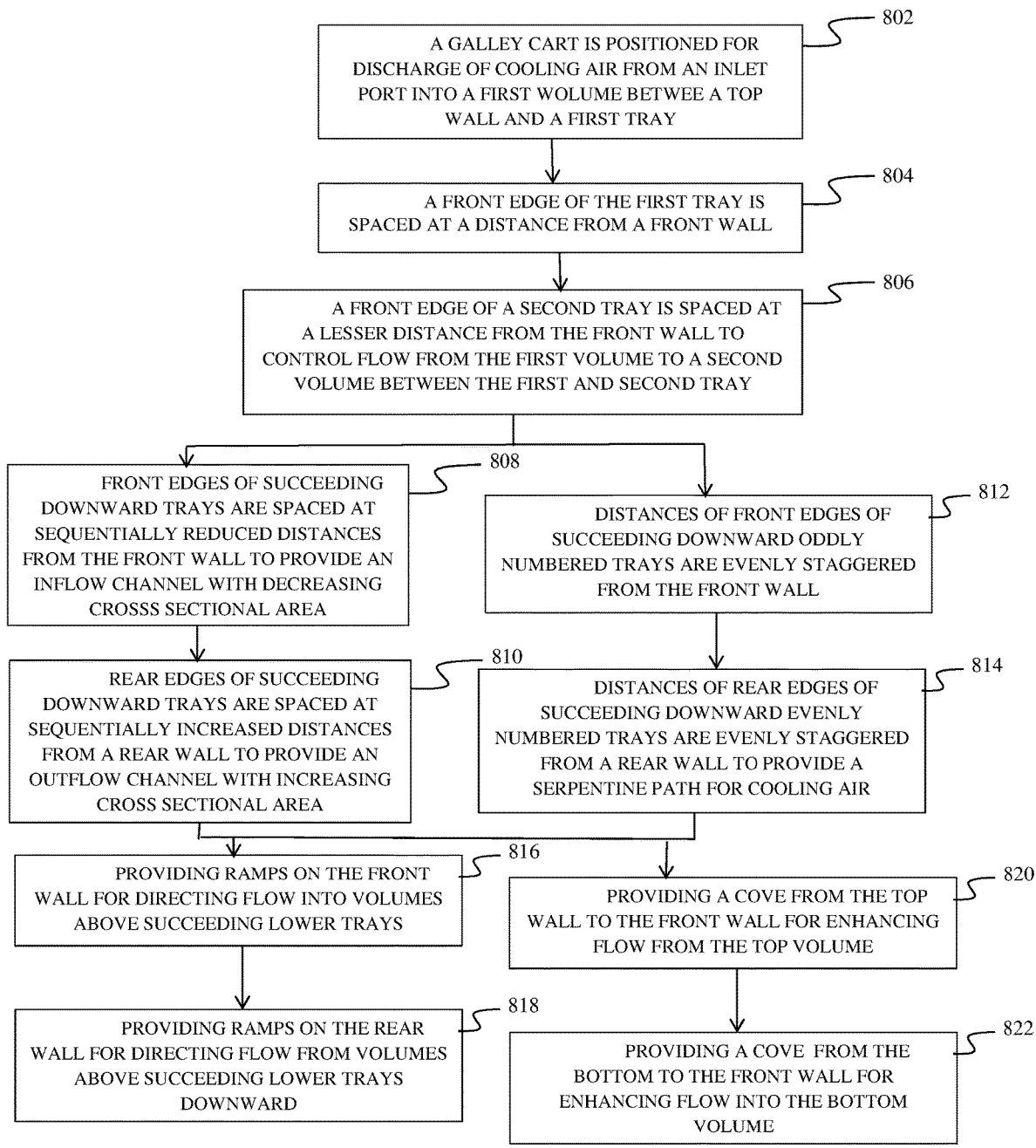
FIG. 8 is a flowchart demonstrating the operation of the embodiments disclosed herein.

The embodiments described provide a method for creating uniform distribution of cooling air through a galley cart as shown in FIG. 8 by positioning a galley cart inlet port 120 in a galley airflow system, cooling air is discharged into a first volume between a top wall 108 and a first tray 124a, step 802. Spacing a front edge of the first tray 124a at a distance from a front wall or door 112, step 804, and spacing a front edge of a second tray 124b at a lesser distance from the front wall, step 806, controls flow from the first volume 146a into a second volume 146b between the first tray and the second tray. In the first embodiment, spacing front edges of succeeding downward trays at sequentially reduced distances from the front wall, step 808, and rear edges of the succeeding downward trays at sequentially increased distances from a rear wall 113, step 810, provides an inflow channel 134 with decreasing cross sectional area at sequentially lower trays and outflow channel 136 with increasing cross sectional area at sequentially lower trays for distribution of cooling air into volumes over the trays.

In the second embodiment, evenly staggering the distance of front edges of succeeding downward oddly numbered trays from the front wall, step 812, and evenly staggering the distance of rear edges of succeeding lower evenly numbered trays from the rear wall, step 814, provides a serpentine path for flow of the cooling air through the volumes between succeeding lower trays to the outlet port 122. Providing ramps 150a on the front wall for directing flow into volumes above succeeding lower trays, step 816, enhances uniform flow into the volumes and providing ramps 150b on the rear wall for directing flow from volumes above succeeding lower trays downward, step 818, enhances uniform flow from the volumes. Providing a cove 148a from the top wall to the door, step 820, similarly enhances uniform flow from the top volume 146a. Providing a cove 148b from the door to the bottom wall of the housing, step 822 enhances uniform flow entering the bottom volume 146n+1.

Having now described various embodiments of the invention in detail as required by the patent statutes, those skilled in the art will recognize modifications and substitutions to the specific embodiments disclosed herein. Such modifications are within the scope and intent of the present disclosure as defined in the following claims.

What is claimed is:

1. A galley cart comprising:
a closed housing with an inlet port in a rear wall in fluid communication with a first volume and an outlet port;
a plurality of removable dividers of even length including a first divider forming a bottom of the first volume and having a first front edge and a first rear edge, wherein a first distance is defined between the first front edge and a door forming a first channel in fluid communication with a second volume and a second divider forming a bottom of the second volume and having a second front edge, wherein a second distance less than the first distance is defined between the second front edge and the door, and said second divider having a second rear edge spaced from the rear wall of the housing, the second rear edge forming a second channel in fluid communication with the second volume, wherein dividers in the plurality of dividers successively lower from the first and second dividers have front edges and rear edges, each successively lower divider forming a successive volume,
the front edges at sequentially narrowing distance from the door and rear edges at sequentially widening distance from the rear wall, said front edges continuing the first channel with reducing area descending from the first divider to a bottom divider, each successive volume in fluid communication with the first channel, and the rear edges continuing the second channel with increasing area descending from the first divider to the bottom divider, each successive volume in fluid communication with the second channel thereby controlling flow from the first volume to the second volume and to each successive volume;
stops mounted to side walls to engage the second rear edge and rear edges of the successively lower dividers, said stops adapted to position the second divider and the successively lower dividers with respect to the rear wall, the stops engaging the second rear edge and rear edges of each successively lower divider to restrain the plurality of dividers at the sequentially widening distance from the rear wall to form the second channel and space the plurality of dividers at the sequentially narrowing distance from the door; and
a triangular bumper mounted to the door and contacting the front edges of the each of the plurality of dividers to urge each divider against the stops.

2. The galley cart as defined in claim 1 further comprising a first cove in a top wall adjacent the door.

3. The galley cart as defined in claim 1 wherein the inlet port is aligned with a first volume between a top wall and the first divider for flow into the first volume.

4. The galley cart as defined in claim 1 wherein the inlet port is aligned with the first divider for bisected flow into a first volume and a second volume, the first volume defined between a top wall and the first divider and the second volume defined between the first divider and the second divider.

5. The galley cart as defined in claim 1 wherein the exhaust port is aligned with a bottom volume to receive flow from the bottom volume, the bottom volume defined between a bottom wall and a divider adjacent the bottom wall.

6. A method for uniform distribution of cooling air flow in a galley cart, the method comprising:
inserting a plurality of removable dividers of even length in a closed housing, the housing having a door and a rear wall with a triangular bumper attached to the door, with an inlet port in the rear wall and an outlet port to discharge a flow, said inlet port providing flow into a first volume between a top wall and a first divider in the plurality of dividers forming a bottom of the first volume;

spacing a front edge of the first divider at a first distance from the door by contacting the bumper with the door in a closed position forming a first channel, the first divider having a rear edge; and, spacing a front edge of a second divider in the plurality of removable dividers at a second distance less than the first distance from the door by contact with the bumper to control flow the first volume into a second volume between the first divider and the second divider, said second divider forming a bottom of the second volume, said second divider having a second rear edge spaced from the rear wall of the housing, the second rear edge forming a second channel in fluid communication with the second volume;

spacing front edges of a remaining plurality of dividers spaced downward between the second divider and a bottom of the housing at sequentially reduced distances from the front wall by contacting the bumper to maintain the first channel, each successively lower divider forming a successive volume; and, spacing rear edges of the plurality of dividers at sequentially increased distances from a rear wall by contacting stops mounted to side walls to maintain the second channel with decreasing cross sectional area and first channel with increasing cross sectional area for distribution of cooling air into each successive volume over the dividers, the bumper contacting the front edges of the each of the plurality of dividers to urge each divider against the stops.

7. The method as defined in claim 6 further comprising: directing flow into the first channel with a cove in a top wall adjacent the door.

8. The galley cart as defined in claim 1 further comprising a first cove in a top wall adjacent the door and wherein the inlet port is aligned with a first volume between a top wall and the first divider for flow into the first volume.

9. The galley cart as defined in claim 1 further comprising a first cove in a top wall adjacent the door and wherein the inlet port is aligned with the first divider for bisected flow into a first volume and a second volume, the first volume defined between a top wall and the first divider and the second volume defined between the first divider and the second divider.

10. The galley cart as defined in claim 1 further comprising a first cove in a top wall adjacent the door and wherein the inlet port is aligned with a first volume between a top wall and the first divider for flow into the first volume and wherein the exhaust port is aligned with a bottom volume to receive flow from the bottom volume, the bottom volume defined between a bottom wall and a divider adjacent the bottom wall.

11. The galley cart as defined in claim 1 further comprising a first cove in a top wall adjacent the door and wherein the inlet port is aligned with the first divider for bisected flow into a first volume and a second volume, the first volume defined between a top wall and the first divider and the second volume defined between the first divider and the second divider and wherein the exhaust port is aligned with a divider adjacent a bottom wall to receive flow from a volume above the divider adjacent the bottom wall and from a bottom volume, the bottom volume defined between the bottom wall and the divider adjacent the bottom wall.

12. The galley cart as defined in claim 1 wherein the inlet port is aligned with a first volume between a top wall and the first divider for flow into the first volume and wherein the exhaust port is aligned with a bottom volume to receive flow from the bottom volume, the bottom volume defined between the bottom wall and a divider adjacent the bottom wall.

13. The galley cart as defined in claim 1 wherein the inlet port is aligned with the first divider for bisected flow into a first volume and a second volume, the first volume defined between a top wall and the first divider and the second volume defined between the first divider and the second divider and wherein the exhaust port is aligned with a divider adjacent a bottom wall to receive flow from a volume above the divider adjacent the bottom wall and from a bottom volume, the bottom volume defined between the bottom wall and the divider adjacent the bottom wall.

14. The galley cart as defined in claim 1 further comprising a first cove in a top wall adjacent the door and wherein the exhaust port is aligned with a bottom volume to receive flow from the bottom volume, the bottom volume defined between a bottom wall and a divider adjacent the bottom wall.

15. The galley cart as defined in claim 1 further comprising a first cove in a top wall adjacent the door and wherein the exhaust port is aligned with a divider adjacent a bottom wall to receive flow from a volume above the divider adjacent the bottom wall and from a bottom volume, the bottom volume defined between the bottom wall and the divider adjacent the bottom wall.

16. A galley cart comprising:
a closed housing with an inlet port in a rear wall in fluid communication with a first volume and an outlet port;
a plurality of removable dividers of even length including a first divider forming a bottom of the first volume and having a first front edge and a first rear edge, wherein a first distance is defined between the first front edge and a door forming a first channel in fluid communication with a second volume and a second divider forming a bottom of the second volume and having a second front edge, wherein a second distance less than the first distance is defined between the second front edge and the door, and said second divider having a second rear edge spaced from the rear wall of the housing, the second rear edge forming a second channel in fluid communication with the second volume, wherein dividers in the plurality of dividers successively lower from the first and second dividers have front edges and rear edges, each successively lower divider forming a successive volume, the front edges at sequentially narrowing distance from the door and rear edges at sequentially widening distance from the rear wall, said front edges continuing the first channel with reducing area descending from the first divider to a bottom divider, each successive volume in fluid communication with the first channel, and the rear edges continuing the second channel with increasing area descending from the first divider to the bottom divider, each successive volume in fluid communication with the second channel thereby controlling flow from the first volume to the second volume and to each successive volume, wherein the inlet port is aligned with the first volume between a top wall and the first divider for flow into the first volume and wherein the exhaust port is aligned with a bottom volume to receive flow from the bottom volume, the bottom volume defined between a bottom wall and the bottom divider;

stops mounted to side walls to engage the second rear edge and rear edges of the successively lower dividers, said stops adapted to position the second divider and the successively lower dividers with respect to the rear wall, the stops engaging the second rear edge and rear edges of each successively lower divider to restrain the plurality of dividers at the sequentially widening distance from the rear wall to form the second channel and space the plurality of dividers at the sequentially narrowing distance from the door;

a triangular bumper mounted to the door and contacting the front edges of the each of the plurality of dividers to urge each divider against the stops; and a first cove in the top wall adjacent the door.

* * * * *